United States Patent [19]

Lambert et al.

[11] Patent Number: 5,213,080
[45] Date of Patent: May 25, 1993

[54] IGNITION TIMING CONTROL

[75] Inventors: John E. Lambert, Dublin, Ohio;
George M. Bedross, Southfield, Mich.

[73] Assignee: Gas Research Institute, Chicago, Ill.

[21] Appl. No.: 911,886

[22] Filed: Jul. 10, 1992

[51] Int. Cl.⁵ .................................................. F02P 5/15
[52] U.S. Cl. ..................................... 123/417; 123/609
[58] Field of Search .............. 123/416, 417, 418, 612, 123/609

[56] References Cited

U.S. PATENT DOCUMENTS

| | | | |
|---|---|---|---|
| 4,167,927 | 9/1979 | Mikami et al. | 123/609 |
| 4,268,888 | 5/1981 | Bodig et al. | 361/236 |
| 4,280,461 | 7/1981 | Okuda et al. | 123/418 |
| 4,305,370 | 12/1091 | Hohne | 123/609 |
| 4,317,437 | 3/1982 | Lindgren | 123/414 |
| 4,356,808 | 11/1982 | Bodig et al. | 123/614 |
| 4,362,144 | 12/1982 | Yamaguchi et al. | 123/609 |
| 4,434,770 | 3/1984 | Nishimura et al. | 123/494 |
| 4,509,494 | 4/1985 | Nishitoba | 123/609 |
| 4,519,038 | 5/1985 | Matsui et al. | 364/431.03 |
| 4,552,118 | 11/1985 | Fukaya | 123/609 |
| 4,584,978 | 4/1986 | Sasaki et al. | 123/417 |
| 4,690,123 | 9/1987 | Kimura et al. | 123/612 |
| 4,718,395 | 1/1988 | Iwata et al. | 123/615 |
| 4,747,382 | 5/1988 | Suzuki et al. | 123/418 |
| 4,870,935 | 10/1989 | Araki | 123/417 X |
| 4,892,073 | 1/1990 | Yamamoto et al. | 123/417 |
| 4,933,861 | 6/1990 | Allen et al. | 123/609 X |
| 4,936,275 | 6/1990 | Takeda | 123/417 |
| 4,969,438 | 11/1990 | Matsuoka et al. | 123/418 |
| 4,976,247 | 12/1990 | Schmied et al. | 123/609 X |
| 5,004,981 | 4/1991 | Hashimoto et al. | 324/207.22 |
| 5,014,675 | 5/1991 | Koiwa | 123/609 |
| 5,043,900 | 8/1991 | Allen et al. | 123/609 X |
| 5,050,554 | 9/1991 | Ichikawa | 123/419 |

Primary Examiner—Willis R. Wolfe
Attorney, Agent, or Firm—Brooks & Kushman

[57] ABSTRACT

An electronic control system for an internal combustion gas engine adapted to control the timing pulse for spark ignition in a single cylinder gas engine wherein precise timing of the spark advance throughout a wide range of engine speeds can be achieved whereby efficient burning of a lean air/fuel mixture in the combustion chamber of the engine can be achieved to minimize undesirable exhaust gas emissions and to increase the operating engine efficiency.

9 Claims, 6 Drawing Sheets

IGNITION TIMING CONTROL

TECHNICAL FIELD

This invention relates to ignition timing controls for an internal combustion engine with a single cylinder

GENERAL DESCRIPTION OF THE INVENTION AND DISCUSSION OF BACKGROUND ART

A gas engine capable of incorporating the improvements of the invention may be seen by referring to U.S. application Ser. No. 917,764, filed Jul. 21, 1992, entitled "Lean Burn Internal Combustion Engine", still pending; U.S. application Ser. No. 911,960, filed Jul. 10, 1992, entitled "Fuel System and Constant Pressure Governor For A Single Cylinder Four Stroke Cycle Engine", still pending; and U.S. application Ser. No. 914,360, filed Jul. 14, 1992, entitled "Carburetor Assembly For An Internal Combustion Engine, still pending." These applications are assigned to the assignee of the present invention.

The engine that is controlled by the control system of the invention is a single cylinder, natural gas engine adapted to drive a heat pump compressor in a residential heat pump installation. The engine control system includes a microcomputer that accepts input signals from engine sensors and from the heat pump controller. The engine control system includes three separate modules, the first being the microcomputer electronics unit for executing the appropriate ignition timing strategy for both the starting mode and the engine running mode, the second being the spark control unit for amplifying the signals developed by the electronics unit and for driving the ignition coil primary winding, and the third being a controller power supply.

The electronics unit in a preferred embodiment of the invention is an Intel 8098 microprocessor adapted to receive input signals from engine monitoring sensors and operating commands from the engine control system. It acts upon the information received from the sensors and develops control signals to provide an appropriate response of a throttle stepper motor for varying the throttle position of a gas and air venturi carburetor, a natural gas supply valve, a fuel enrichment valve for assisting the carburetor assembly in developing an appropriate mixture for cold starting, the spark control unit, and the starter solenoid and motor relay. The throttle position that is established by the electronics unit provides for the most efficient engine starting condition and speed regulation. The electronics unit also achieves the optimal ignition timing and sequencing of the fuel valve and enrichment valve.

Ignition timing is based on a speed pickup signal from a magnetic proximity sensor that is triggered by a triggering element on the camshaft for the engine, which operates at one-half crankshaft speed. A timing pulse is developed using the pickup signal from the sensor. The leading edge of the timing pulse occurs when the signal from the sensor crosses a threshold voltage. The magnitude of the threshold voltage may vary as a function of peak cam sensor voltage. The trailing edge of the timing pulse occurs when the signal from the sensor crosses from a positive voltage value to a negative voltage value.

During starting, the spark occurs at about 10° before top dead center. During normal running, the spark advance is in the range of 12° to 21° before top dead center.

For normal spark advances before top dead center, the crank angle location corresponding to the trailing edge of the timing pulse is repeatable, but the crank angle location of the leading edge will vary depending upon the sensor gap for the magnetic pickup and the engine speed When the engine is running, the microprocessor electronics unit receives a signal triggered by the leading edge of the timing pulse and the trailing edge of the timing pulse. These values are used as reference points in order to determine when the controller should turn the primary current on and off, thus achieving an ignition spark.

It is possible to infer from the timing pulse the width of the pulse in crank angle degrees. This is done by measuring in real time the cycle time and by measuring the width of the timing pulse in real time. The timing pulse for purposes of the present invention does not vary significantly in value from one cycle to the next during normal operation. During cranking of the engine, the leading edge of the timing pulse triggers the start of the current flow through the primary winding of the ignition coil. The trailing edge of the timing pulse triggers the interruption of the primary current.

During the running mode, the primary current is switched off using the leading edge of the current timing pulse as a timing reference point. The primary current is turned on at a fixed time interval—the dwell time—prior to the turn-off time. The turn-on time may occur either before or after the leading edge of the timing pulse, depending on engine speed. If the turn-on is to occur prior to the leading edge, then the turn-on is determined with reference to the leading edge of the previous timing pulse. Otherwise, the turn-on time is determined with reference to the leading edge of the current timing pulse.

The control system includes a throttle control that includes a proportional-integral-derivative (PID) control algorithm. The speed of the engine is regulated in this manner. The throttle control measures the engine speed and obtains a value for the desired or commanded speed, and a comparison is made. The speed error is used as the input to a PID algorithm. The output of the PID algorithm develops a signal that is used for controlling an electrical stepper motor coupled directly to the carburetor throttle.

We are aware of prior art teachings that deal with ignition timing of an internal combustion engine wherein an ignition timing pulse is established using signal generators and the timing pulse in turn is used by a controller to establish the spark advance. An example of an arrangement of this kind is shown in U.S. Pat. No. 4,969,438, which describes an ignition timing controller having an ignition timing calculator which receives an input signal for first and second piston positions measured in crankshaft degrees. A delay time is calculated using the input signals to generate an ignition signal when a predetermined delay time has elapsed from the instant that the piston reaches a first piston position provided the second piston position has not yet occurred. If the second piston position occurs before the first time delay lapses, a second time delay value is substituted and a new ignition signal is generated. In this way, the controller is able to compensate for sudden speed increases. There is no tendency, therefore, for ignition to occur too late in those running conditions in which the engine is accelerating quickly.

Another example of an ignition control system in which spark timing is achieved by the use of ignition pulses generated by an engine speed sensor is the system described in U.S. Pat. No. 4,584,978. The system described in that reference relies upon sensors that detect the amount of engine load as well as the rotational speed of the engine. Those values are used to compute a time period that elapses from the leading edge of a reference pulse signal in order to establish spark timing. The distance between the leading edge and the trailing edge of each reference pulse signal is detected with respect to each cylinder. That is followed by a correction of the computed time in accordance with a detected variation in an attempt to obtain the optimum spark timing without any variation in the timing for one cylinder with respect to another in a multiple cylinder engine.

U.S. Pat. No. 4,936,275 describes an ignition system for a multiple cylinder engine wherein a timing pickup signal generates a reference pulse as the value of the pickup signal rises above zero and falls below zero. In the '275 patent, the ignition timing is triggered by the leading edge of the reference pulse. It is assumed in this strategy that the time from the leading edge to the trailing edge of the reference pulse equals the total cycle time for the previous engine cycle multiplied by the ratio of the pulse time to the total cycle time in the previous cycle of the current cylinder.

None of these prior art teachings embodies the concept involved in the present invention wherein ignition timing for a single cylinder engine is established during normal running by detecting the cycle time measured between the trailing edges of two timing pulses in a previous engine cycle and wherein that value of cycle time is assumed to be unchanged as it is used in a computation of the new delay in the development of the spark by interruption of the primary coil current. That computation involves an estimate or prediction of the time from the leading edge to the trailing edge of the timing pulse based on measurements of the previous engine cycle. It assumes that the timing pulse width of the current cycle is equal to the corresponding timing pulse width of the previous cycle. It assumes further that the distance between the timing pulse remains unchanged from cycle to cycle.

The present invention involves also a determination of the delay angle measured from the leading edge of the current timing pulse to the ignition point at which the primary current is turned off. The latter computation involves a selection from the memory portion of the microprocessor a value that is an indicator of the spark advance that is determined to be the optimal spark advance value corresponding to the speed and engine load values that are detected by speed and load sensors for the engine.

BRIEF DESCRIPTION OF THE DRAWINGS

FIG. 6 is a flow chart showing the logic sequence for executing the instructions in the microprocessor as the engine enters the engine run mode following engine cranking.

PARTICULAR DESCRIPTION OF THE INVENTION

Figure 1:
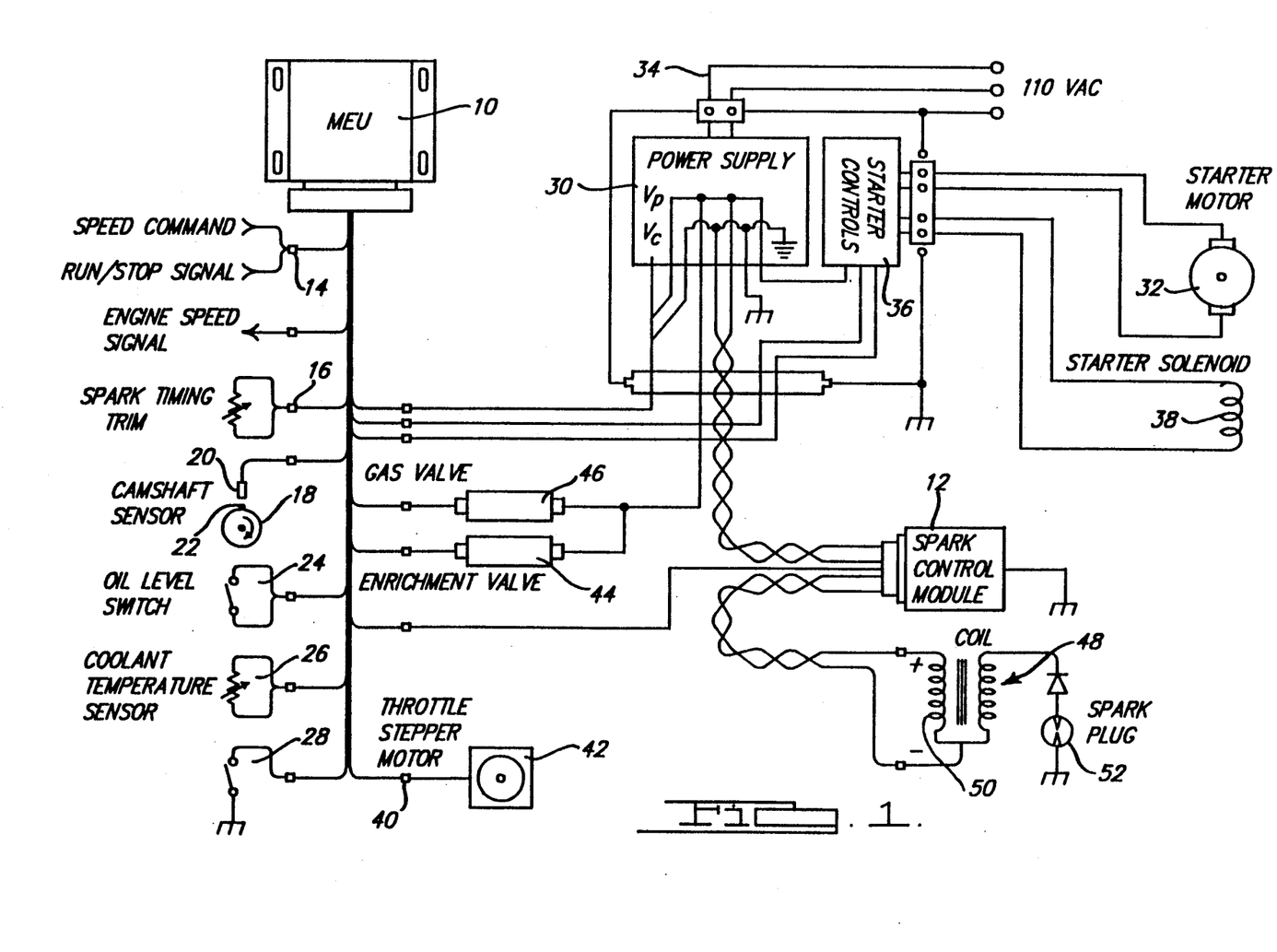
FIG. 1 is a schematic representation of the engine control system together with the input and output connections for the microcomputer electronics unit (MEU).

In FIG. 1, reference numeral 10 designates a microprocessor electronics unit (MEU) which interacts with a spark control module for the engine as shown at 12. The microprocessor, in a preferred embodiment of the invention, is an Intel 8098 microcontroller and includes an input signal processing section for receiving signals from an engine speed sensor, a throttle position measuring means, a spark timing calibrator, an oil level switch, a coolant temperature sensor, and a lube pressure switch.

The microprocessor 10 includes a random access memory (RAM) having registers that receive the information obtained by the various sensors. It includes also a central processor section which receives the information stored in the memory and operates on it in accordance with a control program or strategy located in a read-only memory section (ROM). Information or data that is read by the processor in each background control loop is stored in registers in RAM. The processor, after acting on the data, develops an output that is transferred to the spark control module and finally to the engine ignition coil circuit as well as to the engine throttle control. An internal control bus in the microcomputer establishes communication between the memory sections and the processing unit or CPU and between the CPU and the input conditioning signal circuit and an output driver circuit.

The CPU executes programs that are fetched from memory and provides the appropriate throttle position signal for the throttle control and the ignition timing signal. The input signal conditioning circuit and the output driver circuit allow the microprocessor to read the input data and to send a control signal to the engine timing control portion. Under the program control, the memory stores the programs and data and provides data to the processor as well as accepting new data from the processor for storage.

The RAM portion of the memory stores information read by the processor in each background loop. The RAM portion of the memory also holds or temporarily stores the results of the computations of the CPU as well as other data. The contents of the RAM can be erased, rewritten or changed depending upon the operating conditions of the engine.

A so-called pointer or program counter sequentially addresses each register in the memory and delivers the information in the respective registers to the CPU, which uses data fetched from the various memory locations in accordance with stored program instructions to produce the output signals for the control of the ignition and engine speed.

When the engine is used in the heat pump system, speed commands and run/stop signals are delivered to the processor 10 as indicated at 14. A calibration spark timing trim signal can be stored in the processor memory using data delivered by a trim input device 16.

A camshaft speed sensor 18 develops an engine speed signal delivered to the processor 10. Sensor 18 comprises a magnetic pickup 20 and a camshaft sensor element 22, the latter being brought into proximity to the pickup 20 once for each camshaft revolution.

The heat pump controller (not shown) will determine the speed command that corresponds to a given heating or cooling load which is measured by the heat pump controller. That speed command, which is determined by the load, is distributed to the microprocessor electronics unit. Other inputs to the microprocessor electronics unit are the outputs from the oil level switch 24, the coolant temperature sensor 26 and the lube pressure switch 28.

A power supply is indicated generally by reference character 30. A starter motor 32 is powered by the supply voltage for the power supply 30 which, in the embodiment disclosed here, is a normal residential 110-volt AC circuit as shown at 34. Starter controls, including a starter relay and a starter solenoid relay, are contained in a starter circuit 36 which is connected electrically to the starter motor brushes and to a starter solenoid 38.

One of the outputs for the electronics unit 10 is the throttle stepper motor output at location 40 in FIG. 1. The stepper motor, which controls the position of the engine throttle valve, is identified at 42. The stepper motor and throttle system for the engine is shown in more particular detail in copending application Ser. No. 914,360 still pending, identified above.

An enrichment valve 44 also is under the control of the electronics unit 10. This valve also is described in copending application Ser. No. 911,960, still pending, identified above. Gas valve 46, which is integral with a gas pressure regulator, also is under the control of the electronics unit.

The engine ignition coil 48 includes field windings 50 which comprise a primary coil under the control of the spark control module 12. When the current to the windings 50 is interrupted, a spark is initiated at spark plug 52 because of the induced voltage caused by primary current interruption.

The control signals for the primary current on/off switching is provided by the electronics unit 10. One of the inputs of the electronics unit is a pickup signal shown in Part "A" of FIG. 2, which is a plot of voltage versus time. The pickup signal is a magnetic pickup having a gradually rising value, as shown at 52, which begins at a voltage level of zero and which rises to a peak 54. After the peak has passed, the voltage decreases in a generally linear fashion as indicated in Part "A" of FIG. 2 until it crosses the zero voltage line at 56. A negative voltage then is developed until a negative voltage peak 58 is reached. Continued rotation of the camshaft then will result in a decrease in the sensor output in accordance with a curve of decreasing slope as shown at 60 until the zero voltage line is reached.

Figure 2:
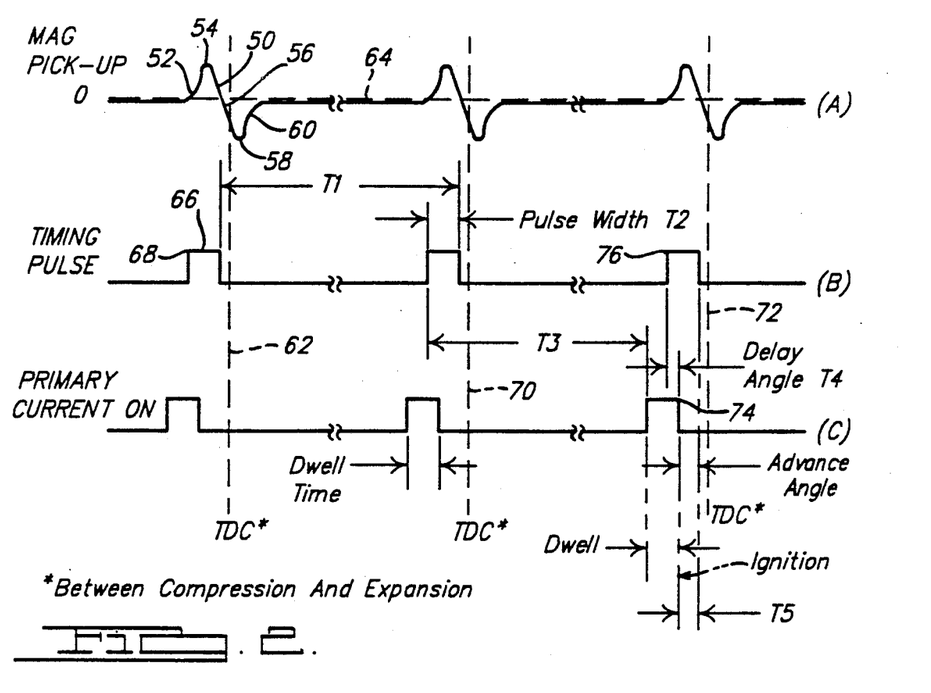
FIG. 2 is a chart showing typical shapes and phase relationships for a magnetic speed pickup, the timing pulse and the primary ignition current in the control system of the invention.

In FIG. 2, the top dead center position for the camshaft is indicated at 62. This corresponds to the uppermost position of the piston in the cylinder. For a description of the piston, cylinder and combustion chamber, reference may be made to copending application Ser. No. 917,764, still pending, identified above.

The power supply 30 generates an unregulated 12 volt DC current to the ignition coil 50, the stepper motor 42, the gas valve 46, a solenoid that operates the enrichment valve 44 and the starter relays shown at 36.

The input signal conditioning portion of the electronics unit compares the rising edge voltage at 52 to a threshold voltage 64. When the threshold voltage 64 is exceeded, a timing pulse 66 is developed as seen in Part "B" of FIG. 2. The sensor pickup signal is conditioned using analog circuits to generate the square wave indicated in Part "B" of FIG. 2. The leading edge of the square wave as shown at 68 occurs when the pickup signal crosses the threshold voltage, which may be about 0.2 volts to 0.5 volts. The width of the square wave depends upon speed. The trailing edge of the square wave corresponds to the point at which the pickup signal pulse crosses the zero voltage line shown at 56.

Since both the amplitude and the width of the sensor output will vary with rpm and sensor air gap, the location of the leading edge of the timing pulse may vary. On the other hand, the location of the trailing edge of the timing pulse is very repeatable. That is, it can be determined with accuracy where the trailing edge will occur as a function of camshaft angle position. Its location is relatively independent of rpm or sensor air gap. According to this invention, the leading edge is used as an ignition reference signal for triggering the interruption of the primary current of the ignition coil and for developing a spark. Although the leading edge location varies with speed and sensor gap, its location will be very nearly constant from one engine cycle to the next. At relatively low engine speed, the leading edge can also be used as a reference to determine when the primary current will turn on. However, at higher engine speeds, the primary current must be turned on prior to the occurrence of the leading edge. In this case, the leading edge of the previous engine cycle is used as the timing reference point.

In the diagram of FIG. 2, the repeated engine cycles are illustrated. Successive top dead center locations for the piston for repeated engine cycles are illustrated in dotted lines, the first being the previously described dotted line 62 and two subsequent top dead center positions being shown at 70 and 72.

The control strategy of the invention measures the cycle time and the pulse time in a previous engine cycle in order to determine the proper trigger point for firing the spark in a later engine cycle, such as the cycle that is completed at the top dead center position 72. Thus during the normal running mode of the engine, the cycle time during an earlier engine cycle is obtained by measuring in real-time the distance between successive trailing edges of two timing pulses shown in Part "B" of FIG. 2. That time is indicated at $T_1$. The strategy also requires measuring in real time the pulse width indicated in 20 FIG. 2, Part "B", by the legend $T_2$. The strategy further assumes that the values for $T_1$ and $T_2$, measured in the previous engine cycle, will remain substantially the same during the engine cycle that terminates at top dead center position 72.

The electronics unit is calibrated assuming that the current crankshaft angular velocity will equal the average angular velocity during the previous engine cycle. Of course, if the engine should be accelerating or decelerating, an error will occur in estimating new values for $T_1$ and $T_2$. During normal engine operation, however, those errors are small. Typically, they are less than 1 degree crank angle during normal engine running.

The electronics unit is capable of measuring the times $T_1$ and $T_2$ in known fashion by employing a counter and a timing clock that develops clock ticks at a known frequency. The counter will measure the clock ticks between the leading edge of each timing pulse and the trailing edge of each timing pulse, thereby giving an indication of the pulse width. Similarly, the clock ticks are counted by the counter between two successive trailing edges of successive timing pulses. The width of the timing pulse can be converted to crank angle degrees using the formula:

$$\phi_2 = T_2 \times \frac{720}{T_1}$$

where $T_2$ equals the time of the timing pulse, $T_1$ equals the time for one engine cycle and $\phi_2$ is the timing pulse angle. The location of the leading edge of a subsequent timing pulse then is equal to $\phi_2$ plus $\phi_0$ where $\phi_0$ equals the location of the zero crossing with respect to top dead center. This is determined by the hardware design by locating the timing element on the camshaft in such a manner that the zero crossing will occur at a predetermined value before top dead center such as 10 degrees.

During each engine cycle, the electronics unit, as part of its normal data check during each background loop, will determine from the appropriate register in ROM the advance angle shown at $T_5$ in Part "C" of FIG. 2 that will effect the optimal delay angle to achieve optimum brake specific fuel efficiency and a reduced level of undesirable exhaust emissions such as NOx. Shown in Part "C" of FIG. 2 is the signal that turns on the primary current. The primary trailing edge 74 occurs at a time $T_4$ following the time that the timing pulse in that engine cycle goes from low to high, as shown at 76.

The microprocessor obtains an optimal value of spark advance in crank angle degrees with respect to top dead center from a look-up table in memory. The spark advance value is a function of engine speed and load, along with a correction factor for coolant temperature. Since the trailing edge of the timing pulse occurs in advance of the top dead center position (by 10 degrees in the preferred embodiment), that advance value is subtracted from the desired spark advance angle which provides the advance angle of FIG. 2C. With the advance angle determined, the delay angle (angle from the leading edge of the timing pulse to the desired ignition point) is computed as the timing pulse measured on the previous engine cycle minus the advance angle. The delay angle is then converted to a delay time $T_4$ with the following equation:

Delay Time (T4) = (Delay Angle/Pulse Angle)*
Pulse Time

Thus, the primary current is interrupted at a time corresponding to the delay time after the occurrence of a leading edge of the timing pulse.

It is desired to turn on the primary current at a fixed interval of time, called the dwell time, prior to interrupting the current. This ensures sufficient time for the primary current to build up to its peak value. At relatively low engine speeds, the delay time T4 will exceed the dwell time. In this case, a second delay time from the leading edge, which will determine the instant that primary current is initiated, is calculated as the first delay time T4 minus the dwell time.

At higher engine speeds, the delay time T4 will be less than the dwell time. In that case, the time to initiate the primary current is calculated as a delay time from the leading edge of the timing pulse of the previous engine cycle. This delay time corresponds to T3 on FIGS. 2B and C, and is calculated from the equation:

T3 = T1 + T4 − Dwell Time

The location of the initiation of primary current does not require great accuracy since it is only necessary to ensure sufficient time for the current to rise to a desired peak value which, along with the ignition coil inductance, determines the ignition energy delivered to the spark plug.

As explained previously, during normal running, the error that results from changes in the timing pulse width, due to engine acceleration or deceleration, is small. The error during cranking, however, may be very large. Thus, the strategy described above would be inappropriate as an ignition timing strategy during cranking. The cranking strategy, instead, requires that the trailing edge of the timing pulse occur at the desired ignition point during cranking. The ignition then is fired immediately when the trailing edge of the timing pulse is detected. During cranking, the primary current is turned on when the leading edge of the timing signal is detected. The dwell time is allowed to vary during cranking, but is always in excess of the minimum time needed for the primary current to build to the desired value.

This cranking strategy cannot be used during normal running, however, because of the error that would result. Nearly a full engine cycle would elapse between the reference signal and the ignition point. Thus, after the engine fires following the cranking mode, the electronics unit will convert from the cranking mode to the previously described running mode where the trailing edge of the timing signal is used as the reference signal.

The pickup signal shown in Part "A" of FIG. 2 should be accompanied by a relatively low threshold value in order to establish reliable operation at low engine speeds. Because of the shape of the leading edge 52 of the pickup signal, it has been found that at higher speeds, the threshold is crossed even as the signal value is in the slowly rising slope portion of the pickup signal curve. Furthermore, more electronic noise accompanies the signal that is obtained at higher rpm. In order to overcome this problem of noise at higher engine rpm, there is provided a means for increasing the threshold voltage as the speed increases. This is a so-called adaptive threshold voltage feature. As the signal amplitude increases, which is a phenomenon that occurs as the engine speed increases, the threshold voltage also is caused to increase. This feature is explained with reference to FIGS. 3 and 3A.

Figures 3, 3A:
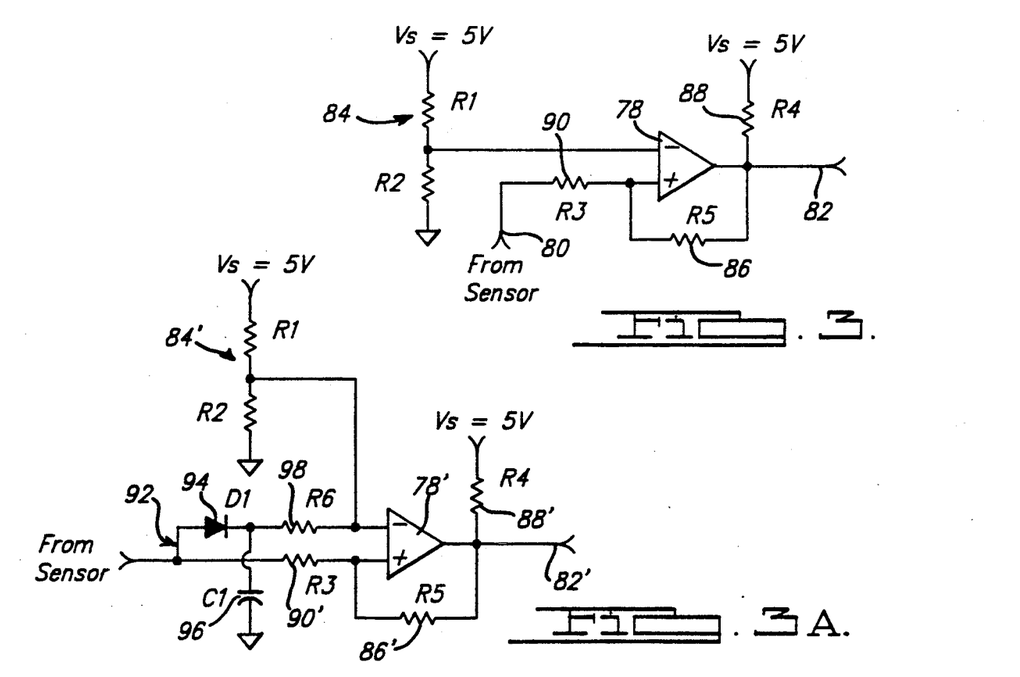
FIG. 3 is a schematic illustration of a simplified magnetic pickup signal processing circuit.
FIG. 3A is an adaptive magnetic pickup signal processing circuit that is capable of adjusting the magnitude of the threshold voltage for the pickup signal at which a timing pulse is initiated so that at high speeds, the threshold voltage is higher than it would be at low speeds.

In FIG. 3, there is shown a comparator 78 which receives a signal from the sensor at input point 80. The timing pulse shown in FIG. 2, Part "B" is obtained from the output point 82 in FIG. 3. In the FIG. 3 embodiment, a fixed threshold voltage is established by the voltage divider R1, R2, as shown at 84. A hysteresis factor is then produced by the combination of resistors 90 (R3) and 86 (R5). A pull-up resistor 88 is located between the voltage supply (5V) and the output point 82.

The sensor voltage at resistor 90 (R3) appears at the plus side of the comparator 78. When that voltage is below the threshold voltage established at the minus side of the comparator 78, the voltage at point 82 is zero. The magnitude of the voltage at the minus side of the oscillator 78 is determined by the voltage divider 84, the power source for the voltage divider being 5 volts. The magnitude of the voltage supplied by the voltage divider to the minus side of the comparator may be about 10 percent of the supply voltage for the circuit of FIG. 3.

Resistors 86 and 90 act to control the reverse current from the output point 82 to the positive side of the comparator 78 after the voltage at point 82 goes high. Thus, the comparator will not switch states until the voltage at the input side of the amplifier falls below a value that is less than the 0.5 volts established by the voltage divider 84.

In the diagram of FIG. 3A, we have shown the same circuit elements described with reference to FIG. 3, although prime notations are added to identify elements that are common to both figures. We have added to the circuit of FIG. 3A, however, a voltage peak detector generally indicated at 92. This comprises a diode 94 and a capacitor 96, one side of which is grounded and the other side of which is connected to the output side of the diode 94. The output side of the diode 94 is connected through resistor 98 to the minus side of comparator 78'. When a voltage peak is reached, a fraction of that peak is transferred to the minus terminal of the comparator 78' by resistor 98.

As the speed increases, the capacitor 96 becomes charged at a higher and higher level at the voltage peaks. The capacitor 96 leaks down through the resistor 98 and R2 of voltage divider 84' to the ground. Thus, at high speeds, the effective voltage at the negative side of the comparator will be higher than at low speeds because the voltage peaks are higher and there will be less decay time for the capacitor 96 between pulses at high speeds than there is at low speeds. Thus, in the adaptive threshold circuit of FIG. 3A, the input signal which is connected to the threshold voltage divider 84' through the capacitor and resistor 98 develops a fractional voltage that is determined by the voltage divider and that is added to the fixed threshold voltage discussed with reference to FIG. 3. The higher the speed, the higher the threshold voltage. Thus, a useable and reliable reference point on the rising portion of the pickup wave signal can be used without the adverse effect caused by the increased electronic noise that accompanies a signal at higher rpm.

Figure 4:
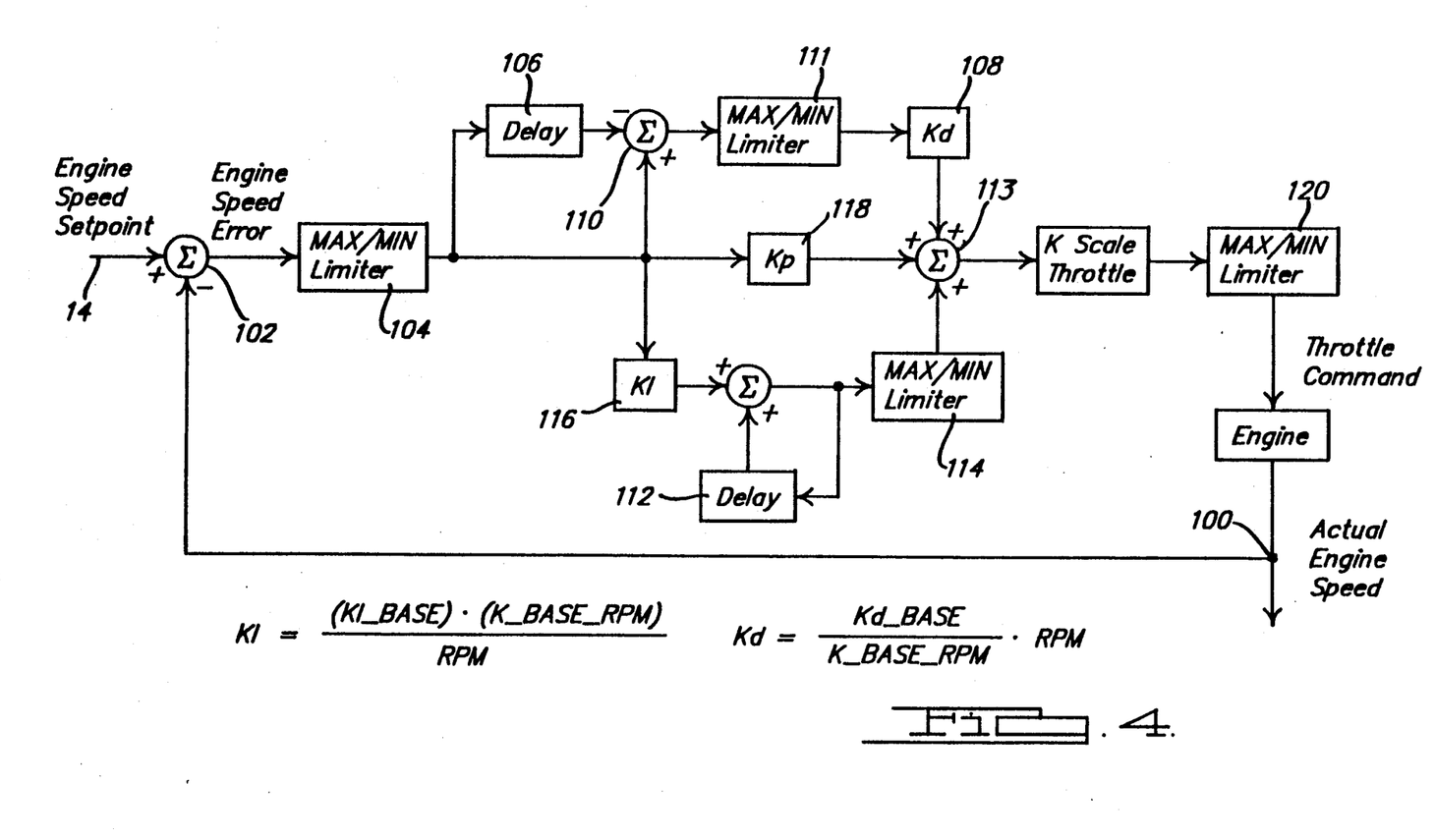
FIG. 4 is a schematic representation of a throttle control block diagram using a PID controller that is effective to issue throttle position commands in response to an error signal determined by the difference between the actual engine speed and the engine speed set point determined by the controller.

The engine throttle control scheme is illustrated in the block diagram of FIG. 4. It includes a digital proportional integral derivative control algorithm in order to regulate the speed of the engine. The engine speed set point, which was described previously with reference to FIG. 1, is determined at 14. The actual engine speed is measured at 100. This is done by using the camshaft sensor shown at 18, 20 and 22 in FIG. 1. The speed error is determined at the summing point 102 shown in FIG. 4.

The speed error signal is first applied to a MAX/MIN limiter 104. The output from this block is processed in three parallel paths to implement the PID logic. Proportional control is accomplished by multiplying the speed error signal by a constant term $K_P$ in block 118. The result is a signal proportional to speed error.

Derivative gain is provided to improve stability and transient response. The derivative logic is implemented in elements 106, 110, 111 and 108. The summing junction 110 computes the rate of change of the speed error by subtracting the speed error computed during the previous engine cycle (output of delay element 106) from the current value of speed error. The output is applied to a MAX/MIN limiter 111 and then multiplied by a derivative gain term $K_D$ 108. The output of the derivative loop is a signal proportional to the rate of change of the speed error.

Integral gain, provided to minimize the steady-state error, is implemented with elements 116, 113, 112 and 114. In block 116, the speed error is multiplied by an integral gain term $K_I$. The result is applied to summing junction 113 where it is added to the cumulative value from previous cycles, which is the output of delay element 112. The result from the summing junction is then applied to MAX/MIN limiter 114. The output of the integral loop is a signal proportional to the value of the speed error integrated over time.

The outputs from the three loops are combined in a summing junction, multiplied by a scaling factor and applied to a MAX/MIN limiter 120 which limits the range of travel of the throttle valve. The result is then applied to the stepper motor controller.

The computations in the PID loops are executed once for each engine cycle. As a result, the derivative and integral gains are affected by engine speed. To compensate for this effect, the integral gain term $K_I$ and the derivative gain term $K_D$ are made to vary with engine speed according to the equations at the bottom of FIG. 4.

If desired, a maximum and minimum limiter circuit 120 can be used to avoid the extremes in the engine throttle command before the command is passed through to the engine throttle stepper motor. The stepper motor for adjusting the throttle may be a 400 step per revolution stepper motor which steps at a rate of 200 steps per second.

Figure 5:
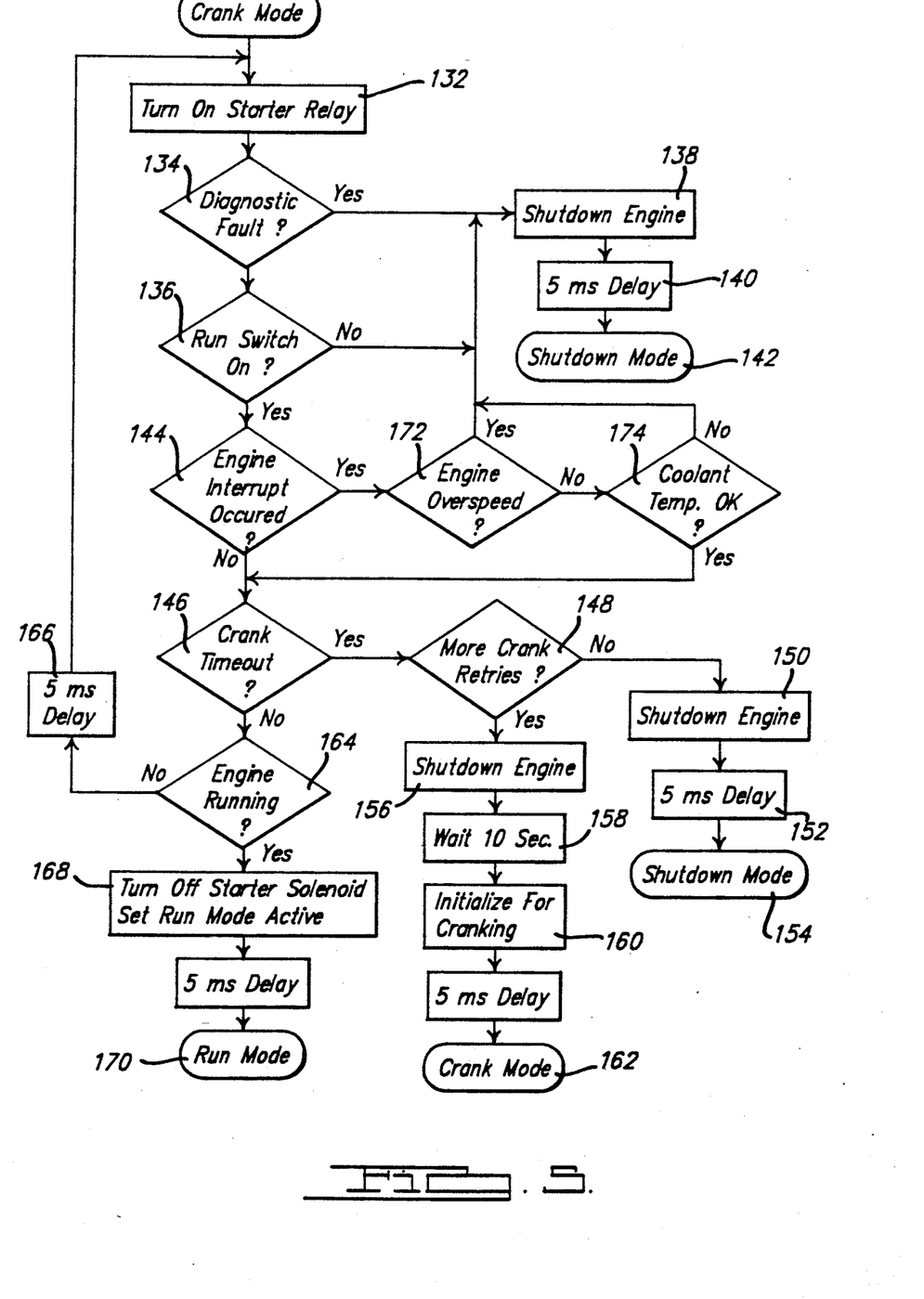
FIG. 5 is a flow chart showing the relationship of the various instructions followed in sequence by the microprocessor during the crank mode of the engine.

FIG. 5 shows the crank mode logic flow. It begins when the heat pump controller (not shown) delivers a signal to the processor which has the effect of turning on the starter relay. This process step is indicated in action block 132 in FIG. 5. The processor then proceeds to the next function, which is an inquiry at step 134 to determine whether there is any diagnostic fault in the system. The processor does a self-check to determine whether all control functions are operable. Assuming that the self-check indicates that there are no system problems, the processor then proceeds to step 136 where a check is made to determine whether the external engine "run" switch is on or off. If the switch is off, the engine will immediately cease cranking and the process flow then proceed to the engine shut-down action block 138.

Following a delay of 5 milliseconds at step 140, the engine enters the engine shut-down mode indicated at 142. The shut-down mode will be described subsequently with reference to FIG. 7.

If the "run" switch is on, the program will proceed to the next step at 144 where a determination is made as to whether a timing pulse trailing edge has been developed. This is referred to in FIG. 5 as the engine interrupt. If a timing pulse trailing edge has not occurred, the program then will proceed directly to step 146 where an inquiry is made with respect to whether the crank timer has run down. If the predetermined time specified for cranking has run down, the process flow will proceed to step 148 where an inquiry is made as to whether the predetermined number of cranking retries has been made in an attempt to start the engine. In a typical embodiment, the number of retries specified by the program may be five. If five retries have been made without success, the process flow then will proceed to the engine shut-down step 150 where, following a 5 millisecond delay at 152, the engine process flow program will enter the shut-down mode at 154. If the number of retries to start the engine has not exceeded five, the logic flow will proceed to step 156 where a determination is made as to whether the engine is running. After a ten second wait at step 158, the logic is initialized at 160 before reentering the crank mode at 162.

If it is determined at step 146 that the crank "time-out" period has not expired, a check is made at step 164 to determine whether indeed the engine is running. If it is not running, the logic then will proceed after a five millisecond delay at 166 to step 132, where the previously described process steps are repeated. On the other hand, if it is determined at step 164 that the engine is running, the engine starter solenoid is turned off at action block 168. The processor then will address those registers in memory that contain the instructions for the run mode as indicated at 170, the crank mode at that point being interrupted.

If at step 144 the inquiry is affirmative, a check is made at step 172 to determine whether the engine speed range is exceeded. If it is, the logic then will proceed to the shut-down step 138 If it is not exceeded, a check then is made of the coolant temperature at step 174 to determine whether the engine is overheated. If the engine coolant temperature is not within the desired range, the engine again will shut-down as the logic flows to action block 138. If the engine coolant is within the desired temperature range, the logic flow then will proceed to step 146 which is described above.

If it is assumed that the engine is running following execution of the crank mode, the processor will enter the action block 176 and turn off the starter relay. This begins the run mode logic shown in FIG. 6.

The relay noted at 176 is separate from the solenoid that is controlled at step 168 in the crank mode flow diagram. The logic then proceeds to step 178, which calls for the enrichment valve to be turned off after a predetermined time delay or when the engine temperature is above a calibrated value. The enrichment valve was turned on during the "cranking" mode, but it is turned off during the "run" mode after the starter relay is turned off.

The logic then proceeds to step 180 where an inquiry is made to make certain whether the engine still is running or has stalled. If it has stalled, the logic flow then will proceed directly to step 182, which calls for the engine to be shut-down. After a five millisecond delay at 184, the process flow then proceeds to the shut-down mode at 186.

If the inquiry at step 180 is negative, a self-diagnostic check is made by the microprocessor to determine whether all of the functions are operable. If there is any problem relating to this diagnostic check, the logic then will proceed directly to the shut-down step 182. If there are no problems, the logic then will proceed from the diagnostic fault check step 188 to step 190 where a check is made to determine whether the run switch is on. If it is not on, the logic then will proceed directly to the engine shut-down at step 182. If the run switch is on, an inquiry is made at step 192 to determine whether a timing pulse trailing edge has occurred. If this has not happened at that instant, the logic flow then will proceed to step 194 where a computation is made to determine the proper engine ignition advance angle. The proper throttle position for the existing engine conditions then is computed at step 196 and after a five millisecond delay at step 198, the processor repeats itself beginning with the step indicated at 176.

If the timing pulse trailing edge has occurred, the logic will then proceed to step 200 to determine whether the speed that is commanded by the logic is within the normal operating range for example, between 1000 and 3000 rpm. If the commanded speed is outside that range, the logic then will proceed directly to the shut-down step shown at 182. If the commanded speed is within the desired range, a check then is made at 202 to determine whether the actual engine speed, as distinct from the commanded speed, is lower than a predetermined value; for example, 1000 rpm. If the speed is too low, the logic then will proceed directly to the engine shut-down stage 182. If the engine speed is higher than the minimum value, a check is made at 204 to determine whether the actual engine speed determined by the engine camshaft speed sensor is higher than the predetermined upper speed limit, which might be about 3000 rpm. If the actual engine speed is higher than the desired limit, the logic will proceed to the shut-down step 182.

If the engine speed is within the desired range, a check is made at step 206 to determine whether the lube pressure is proper and a check is made at step 208 to determine whether the coolant temperature is too high. If the inquiries at steps 206 and 208 are negative, the engine then must shut-down at stage 182. If the logic flows through to step 208, it then proceeds as previously described to the ignition advance angle computation stage 194 and then to the throttle PID control computation stage 196 The logic flow then repeats itself through the previously described logic steps each background loop.

Figure 7:
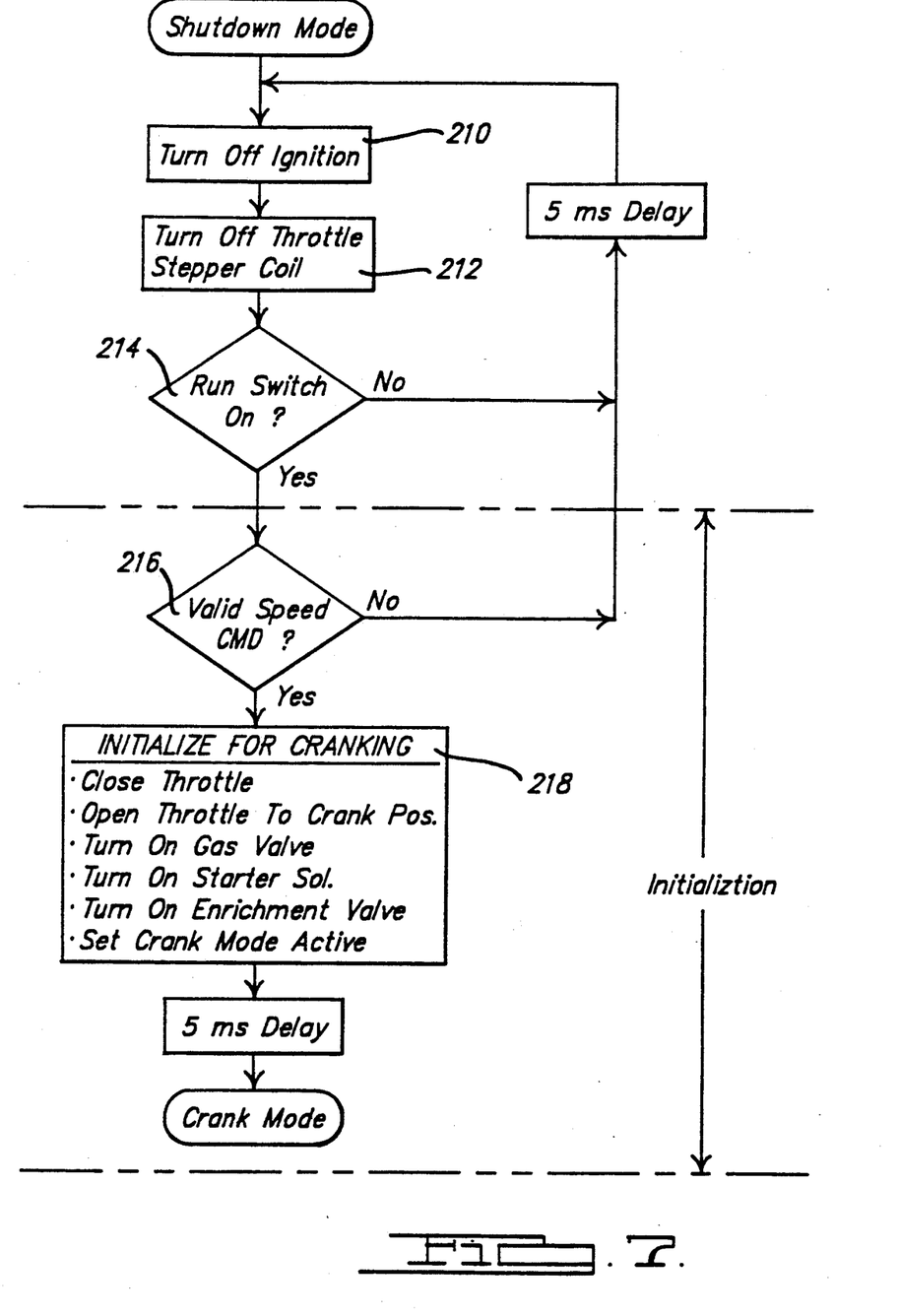
FIG. 7 is a flow chart showing the series of instructions representing the sequence of the execution of the controller steps in the microprocessor during a shutdown mode for the engine.

FIG. 7 shows the engine shut-down mode. After the shut-down mode is entered, the logic will proceed to action step 210, which causes the ignition to be turned off. The logic then proceeds to step 212 where the throttle stepper motor is deactivated. A check then is made at step 214 to determine whether the run switch is on or off. If it is off, the logic flow then will end and the shut-down mode continues. If the run switch is on, the initialization mode is entered. This requires entry into step 216 where a check is made to determine whether the commanded speed is within the desired limits. If it is not within the desired limits, the logic then will return to the shut-down mode as indicated. If the speed command is within the desired limits, the engine is initialized for cranking at step 218. This involves closing of the throttle and then opening the throttle to a predetermined stepper motor position. That stepper motor position is determined by introducing a certain number of timer counts to the engine throttle controller to advance the engine throttle from a closed position to the desired position that is appropriate for engine cranking.

Initialization further includes a step at which the starter motor solenoid is turned on and the enrichment valve is turned on. Having completed those steps, the next step during the initialization is a transfer of the logic sequence to the memory portion in the electronics unit containing the instructions for the crank mode.

Having described a preferred embodiment of the invention, what I claim and desire to secure by U.S. Letters Patent is:

1. An engine ignition control system for controlling the timing of the spark for initiating burning in the combustion chamber of a four stroke cycle, single cylinder, internal combustion engine;

said engine having a cylinder, a piston in said cylinder, a crankshaft connected to said piston, said piston being adapted to reciprocate between a top dead center position and a bottom dead center position;

a speed sensor means for developing periodic sensor voltage timing pulses, the cycle time between timing pulses being an indication of engine crankshaft speed;

means for developing ignition timing pulses, each timing pulse having a leading edge corresponding to a voltage change in a timing voltage pulse and a trailing edge corresponding to an opposite voltage change in a timing voltage pulse;

means for developing a spark voltage including an ignition coil and a source of ignition coil current, said spark voltage occurring at a coil primary current interrupt point;

means for measuring in real-time, cycle time and a timing pulse time for one engine cycle; and means for computing an optimum delay time from the leading edge of a timing pulse for said one cycle to said interrupt point whereby combustion is initiated at a time in advance of the top dead center position.

2. The combination as set forth in claim 1 wherein said computing means comprise a microcomputer electronics unit having a data storage memory containing ignition advance angle values that are determined by crankshaft speed and engine load, said electronics unit including means for calculating the time measured in crankshaft degrees before the top dead center position of said piston for one engine cycle at which said interrupt point is reached.

3. The combination as set forth in claim 2 wherein said electronics unit comprises means for calculating the time measured in crankshaft degrees between the top dead center position of said piston in one engine cycle to the initiation of said coil current whereby said interrupt point occurs after said coil current is initiated.

4. An ignition timing control system for a spark ignition, four stroke cycle, single cylinder, internal combustion engine having a cylinder, a crankshaft and a reciprocating piston in said cylinder connected to said crankshaft, said piston moving in said cylinder between a top dead center position and a bottom dead center position;

a combustion chamber of variable volume defined in part by said piston and cylinder, a spark ignition means in said combustion chamber, an ignition coil connected to said ignition means;

a primary current circuit defined in part by said coil and means for developing a primary current pulse beginning at a fixed dwell time prior to interruption of said current;

an engine crankshaft speed sensor means for developing periodic voltage pickup pulses in advance of the top dead center position for each engine cycle;

means for developing a timing pulse voltage with a leading edge upon a timing voltage increase for each sensor pulse and for interrupting said timing voltage pulse at a trailing edge upon a timing voltage decrease to a low value in advance of each top dead center position of said piston;

means for measuring the cycle time between corresponding edges of two timing pulses and means for measuring the pulse time between said leading and trailing edges of each timing pulse; and means for computing a delay time from the leading edge of a timing pulse for one cycle to an ignition point at which said primary current circuit is interrupted at an optimum time in advance of the top dead center piston position of a subsequent cycle.

5. The combination as set forth in claim 4 wherein said computer means comprises a microcomputer electronics unit having a data storage memory containing ignition advance angle values that are determined by crankshaft speed and engine load, said electronics unit including means for calculating the time measured in crankshaft degrees before the top dead center position of said piston for one engine cycle at which said ignition point occurs whereby ignition is begun at a crankshaft position with an advance angle before the top dead center piston position to effect optimum combustion efficiency with reduced combustion exhaust products.

6. An ignition timing control system for a four stroke cycle, single cylinder, internal combustion gas engine having a crankshaft and a reciprocating piston movable between a top dead center position and a bottom dead center position;

a crankshaft speed sensor means for developing periodic sensor voltage pulses extending from a zero reference voltage to a peak voltage and from a peak voltage to said zero reference voltage, means for developing a threshold voltage higher than said reference voltage but less than said peak voltage;

means for developing an ignition timing voltage pulse extending from a leading edge corresponding to a first crankshaft position at which said sensor voltage equals said threshold voltage;

a trailing edge of said timing pulse corresponding to a second crankshaft position at which said sensor voltage equals zero;

means for measuring engine cycle time between corresponding timing pulse edges and means for measuring the width of said timing pulse between said leading and trailing edges;

means for developing a spark voltage including an ignition coil and a source of ignition coil current, said spark voltage occurring at a coil primary current interrupt point;

means for computing a time delay between the leading edge of a timing pulse for one cycle to said interrupt point whereby said spark voltage initiates combustion at a predetermined instant before the top dead center position of said piston is reached.

7. The combination as set forth in claim 6 wherein said computing means comprise a microcomputer electronics unit having a data storage memory containing ignition advance angle values that are determined by crankshaft speed and engine load, said electronics unit including means for calculating the time measured in crankshaft degrees before the top dead center position of said piston for one engine cycle at which said interrupt point is reached.

8. The combination as set forth in claim 6 wherein said means for developing a threshold voltage comprises adaptive circuit means responsive to an increase in the frequency of said sensor voltage pulses for increasing the threshold voltage level at higher engine speeds whereby a reliable reference threshold voltage is developed notwithstanding increased electronic noise characteristics of higher engine speeds.

9. The combination as set forth in claim 8 wherein said adaptive circuit means comprises a voltage peak detector means communicating with said speed sensor means for increasing the magnitude of said threshold voltage as periodic voltage peaks of increasing magnitude are developed by said speed sensor means.

* * * * *

UNITED STATES PATENT AND TRADEMARK OFFICE
CERTIFICATE OF CORRECTION

PATENT NO. : 5,213,080
DATED : May 25, 1993
INVENTOR(S) : John E. Lambert et al

It is certified that error appears in the above-indentified patent and that said Letters Patent is hereby corrected as shown below:

On the title page, Item [56] References Cited: the correct issue date for Patent No. 4,305,370 is --1981--.

Column 2, line 8, after "speed" insert a period (.).

Column 6, line 66, before "Figure 2" delete "20".

Column 11, line 37, after "step 138" insert a period (.).

Column 12, line 19, after "range" insert a semi-colon (;).

Signed and Sealed this

Twenty-ninth Day of March, 1994

Attest:

BRUCE LEHMAN

Attesting Officer     Commissioner of Patents and Trademarks